United States Patent
Hong et al.

(10) Patent No.: US 12,067,435 B2
(45) Date of Patent: Aug. 20, 2024

(54) NON-REPLICABLE HOLOGRAM QR CODE

(71) Applicant: Korea Electronics Technology Institute, Seongnam-si (KR)

(72) Inventors: Sung Hee Hong, Seoul (KR); Young Min Kim, Seoul (KR); Ji Soo Hong, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/623,221

(22) PCT Filed: Dec. 7, 2021

(86) PCT No.: PCT/KR2021/018426
§ 371 (c)(1),
(2) Date: Dec. 27, 2021

(87) PCT Pub. No.: WO2023/106437
PCT Pub. Date: Jun. 15, 2023

(65) Prior Publication Data
US 2024/0028857 A1    Jan. 25, 2024

(30) Foreign Application Priority Data
Dec. 6, 2021 (KR) .................. 10-2021-0172554

(51) Int. Cl.
*G06K 19/06*    (2006.01)
*G06K 19/16*    (2006.01)

(52) U.S. Cl.
CPC ....... *G06K 19/06037* (2013.01); *G06K 19/16* (2013.01); *G06K 2207/1015* (2013.01)

(58) Field of Classification Search
None
See application file for complete search history.

(56) References Cited

U.S. PATENT DOCUMENTS

| 2018/0144160 A1* | 5/2018 | Shirakura | ............... G06K 7/10 |
| 2022/0266622 A1* | 8/2022 | Kenzari | ............... B42D 25/36 |
| 2023/0134627 A1* | 5/2023 | Harper | ............... G06K 7/1443 382/317 |

FOREIGN PATENT DOCUMENTS

| KR | 10-2014-0115243 A | 9/2014 |
| KR | 10-2017-0111135 A | 10/2017 |

(Continued)

OTHER PUBLICATIONS

Korean Office Action issued on May 30, 2023, in counterpart Korean Patent Application No. 10-2021-0172554 (7 pages in English, 8 pages in Korean).

(Continued)

*Primary Examiner* — Kristy A Haupt
(74) *Attorney, Agent, or Firm* — NSIP Law (57) ABSTRACT

Provided is an uncopyable hologram QR code, According to an embodiment of the present disclosure, a 3D code generation method divides a 2D code having specific information recorded thereon into a plurality of sub 2D codes, and generatES a 3D code by coupling at least one of the divided sub 2D codes at a different depth. Accordingly, a QR code is recorded on a hologram recording medium as a hologram, and is displayed and scanned, so that it is impossible to easily duplicate the QR code unlike an existing 2D QR code.

18 Claims, 6 Drawing Sheets

(56) References Cited

FOREIGN PATENT DOCUMENTS

KR        10-1883233  B1    7/2018
KR    10-2019-0124835  A   11/2019

OTHER PUBLICATIONS

Kim, Youngjun, et al., "Three-Dimensional Optical Encryption of Quick Response Code." Journal of Information & Communication Convergence Engineering 16.3, 2018, (7 pages).
Korean Office Action issued on Sep. 25, 2023, in counterpart Korean Patent Application No. 10-2021-0172554 (7 pages in English, 8 pages in Korean).

* cited by examiner

FIG. 6

NON-REPLICABLE HOLOGRAM QR CODE

CROSS REFERENCE TO RELATED APPLICATIONS

This application is a U.S. National Stage Application of International Application No. PCT/KR2021/018426, filed on Dec. 7, 2021, which claims the benefit under 35 USC 119(a) and 365(b) of Korean Patent Application No. 10-2021-0172554, filed on Dec. 6, 2021, in the Korean Intellectual Property Office, the entire disclosure of which is incorporated herein by reference for all purposes.

TECHNICAL FIELD

The present disclosure relates to a quick response (QR) code, and more particularly, to a QR code of a new concept which is displayed by using a hologram to strengthen security.

BACKGROUND ART

A QR code is a two-dimensional code of a matrix format indicating information with a monochrome grid-like pattern. The QR code is widely utilized since it overcomes capacity restriction of a barcode widely used in related-art technology and stores text data in addition to numbers.

Figure 1:
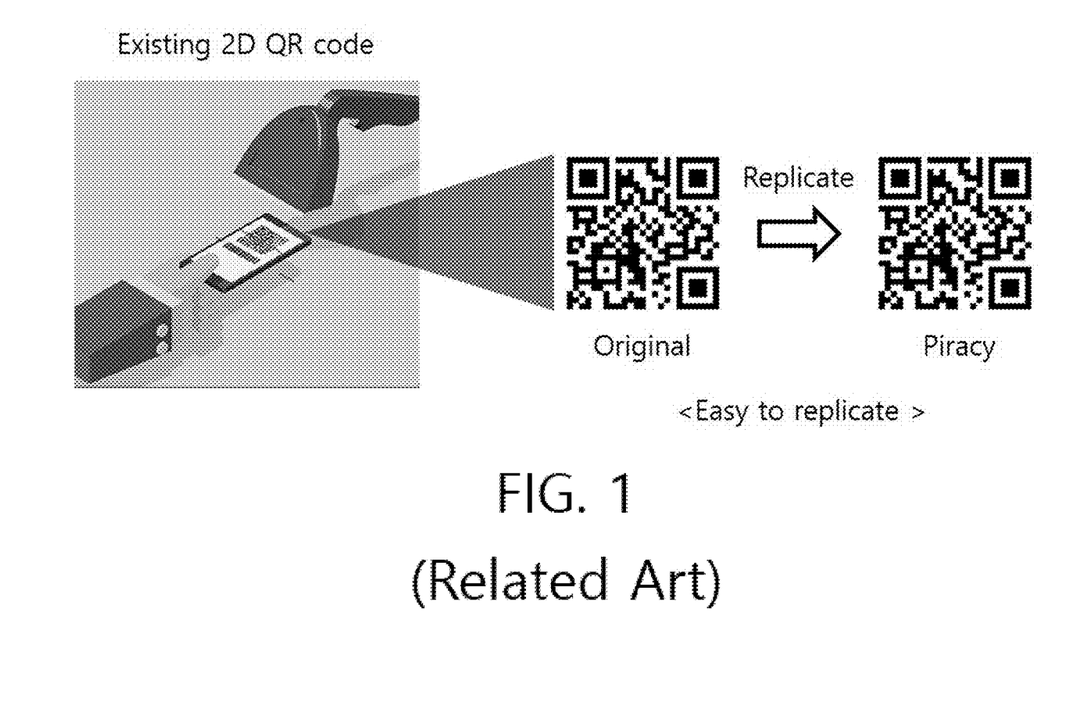
FIG. 1 is a view illustrating a problem of an existing 2D QR code.

However, as shown in FIG. 1, the QR code has a problem that anyone can easily replicate it, and thus is considered unsuitable for a field that requires security.

Accordingly, there is a demand for a security-enhanced QR code, and to achieve this, a QR code of a new concept that is different from an existing QR code in structures and is difficult to duplicate should be suggested.

DISCLOSURE

Technical Problem

The present disclosure has been developed in order to address the above-discussed deficiencies of the prior art, and an object of the present disclosure is to provide a structure of a hologram QR code that is uncopyable, compared to an existing 2D QR code which is easy to duplicate, and a generation method thereof.

Technical Solution

According to an embodiment of the present disclosure to achieve the above-described object, a 3D code generation method includes the steps of: dividing a 2D code having specific information recorded thereon into a plurality of sub 2D codes; and generating a 3D code by coupling at least one of the divided sub 2D codes at a different depth.

The 2D code may be a quick response (QR) code. The step of dividing may include dividing the 2D code in a grid pattern. The step of generating may include coupling all of the divided sub 2D codes at different depths, respectively.

The 3D code generation method according to an embodiment of the present disclosure may further include a step of generating the generated 3D code in a holographic fringe pattern.

The 3D code generation method according to an embodiment of the present disclosure may further include a step of recording the generated holographic fringe pattern on a hologram recording medium.

The 3D code generation method according to an embodiment of the present disclosure may further include: a step of scanning the sub 2D codes constituting the 3D code which is displayed on the hologram recording medium as a hologram; and a step of reconstructing one 2D code by coupling the scanned sub 2D codes on a same plane.

In addition, the step of scanning may include scanning from a sub 2D code having a shallow depth to a sub 2D code having a great depth in sequence while adjusting a focal distance of a camera of a mobile terminal.

In addition, when the reconstructed 2D code has an incomplete form, the step of scanning may be resumed.

According to another embodiment of the present disclosure, a 3D code generation system includes: a hologram generation device configured to divide a 2D code having specific information recorded thereon into a plurality of sub 2D codes, to generate a 3D code by coupling at least one of the divided sub 2D codes at a different depth, and to generate the generated 3D code in a holographic fringe pattern; and a hologram printer configured to record the generated holographic fringe pattern on a hologram recording medium.

According to still another embodiment of the present disclosure, a 3D code generation method includes the steps of: generating a 2D code having specific information recorded thereon; dividing the generated 2D code into a plurality of sub 2D codes; and generating a 3D code by coupling at least one of the divided sub 2D codes at a different depth.

According to yet another embodiment of the present disclosure, a 3D code generation system includes: a hologram generation device configured to generate a 2D code having specific information recorded thereon, to divide the generated 2D code into a plurality of sub 2D codes, to generate a 3D code by coupling at least one of the divided sub 2D codes at a different depth, and to generate the generated 3D code in a holographic fringe pattern; and a hologram printer configured to record the generated holographic fringe pattern on a hologram recording medium.

Advantageous Effects

According to embodiments of the present disclosure as described above, a QR code is recorded on a hologram recording medium as a hologram, and is displayed and scanned, so that it is impossible to easily duplicate the QR code unlike an existing 2D QR code.

In addition, according to embodiments of the present disclosure, a user may experience a 3D QR code of a new type in which depths of parts constituting a hologram QR code are different, and may also experience a new scanning method.

BEST MODE

Hereinafter, the present disclosure will be described in more detail with reference to the drawings.

Embodiments of the present disclosure provide a hologram quick response (QR) code that is difficulty to copy. The hologram QR code suggested in embodiment of the present disclosure is generated in a stereoscopic pattern to provide a sense of depth by using holographic technology, so that it is difficult to duplicate the QR code and the QR code is applied to a service requiring security.

Figure 2:
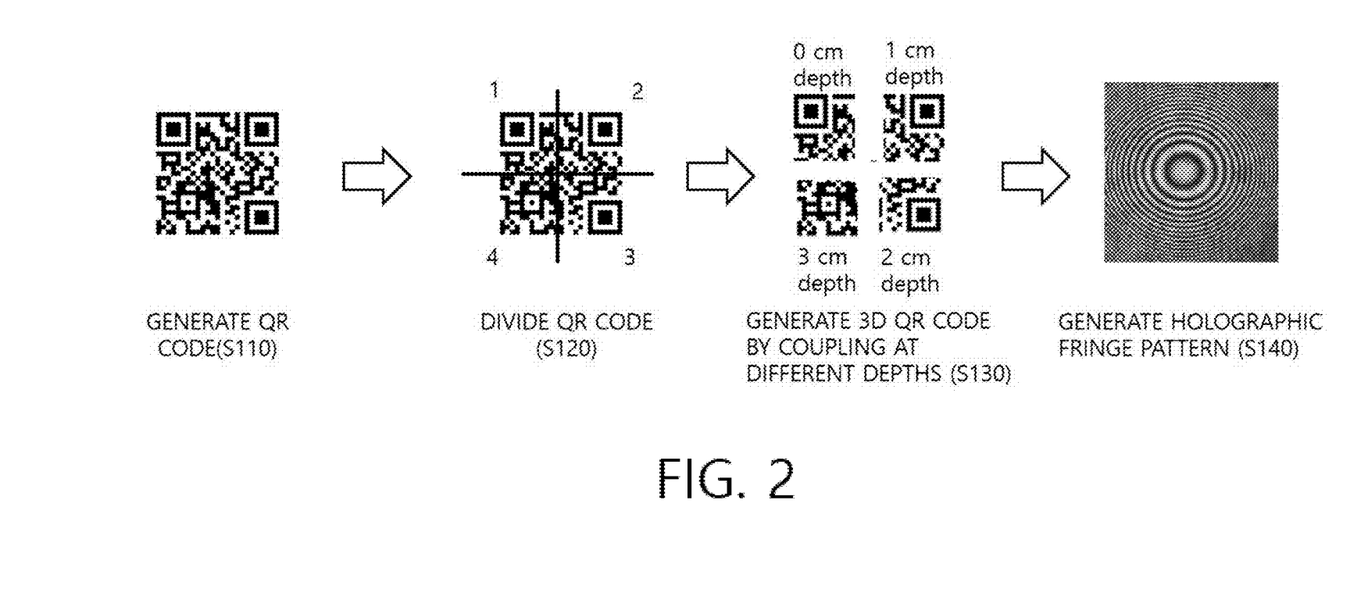
FIG. 2 is a view provided to explain a hologram QR code generation method according to an embodiment of the present disclosure.

FIG. 2 is a view provided to explain a hologram QR code generation method according to an embodiment of the present disclosure.

In order to generate a hologram QR code, a QR code having desired information recorded thereon is generated (S110). The QR code generated at step S110 refers to a normal 2D QR code which is used in related-art technology.

Next, the QR code generated at step S110 is divided into a plurality of sub QR codes (S120).

FIG. 2 illustrates that the QR code generated at step S110 is divided into four sub QR codes in a grid pattern. However, the method of dividing the QR code generated at step S110 and the number of sub QR codes are changeable.

That is, the QR code may be divided into 4 sub codes as suggested in FIG. 2, or may be divided into 9 sub codes or 16 sub codes, and the QR code may be divided in other patterns than the grid pattern. The divided sub QR codes may have different sizes.

Thereafter, the sub QR codes divided at step S120 may be coupled with one another in different depths, thereby generating a 3D QR code (S130).

FIG. 2 illustrates that the sub QR codes are coupled with one another with the first sub QR code being 0 cm deep, the second sub QR code being 1 cm deep, the third sub QR code being 2 cm deep, and the fourth sub QR code being 3 cm deep.

Figure 3:
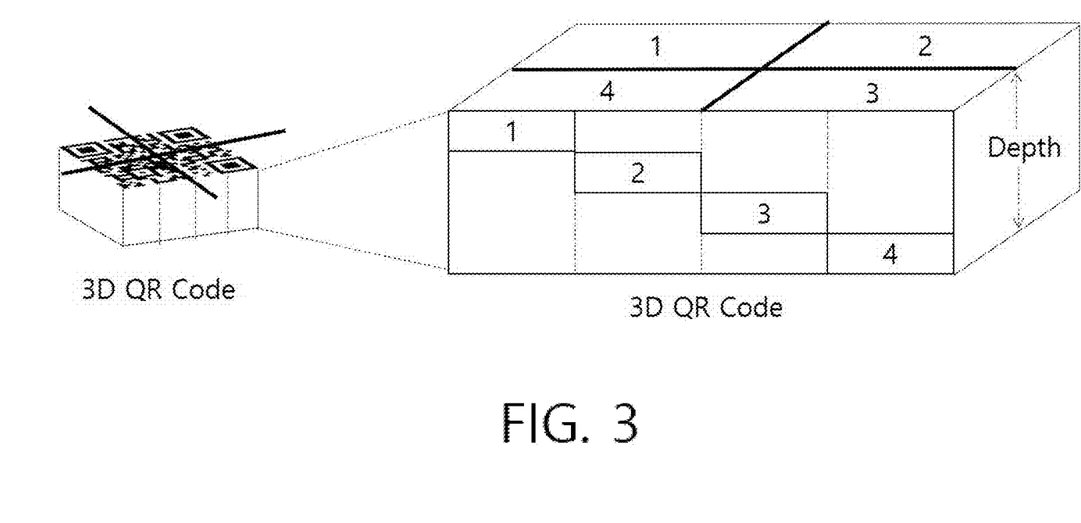
FIG. 3 is a view illustrating a depth structure of a 3D QR code.

FIG. 3 illustrates a depth structure of the 3D QR code generated at step S130. As shown in FIG. 3, the sub QR codes of the 3D QR code are positioned at different depths, respectively.

Figure 4:
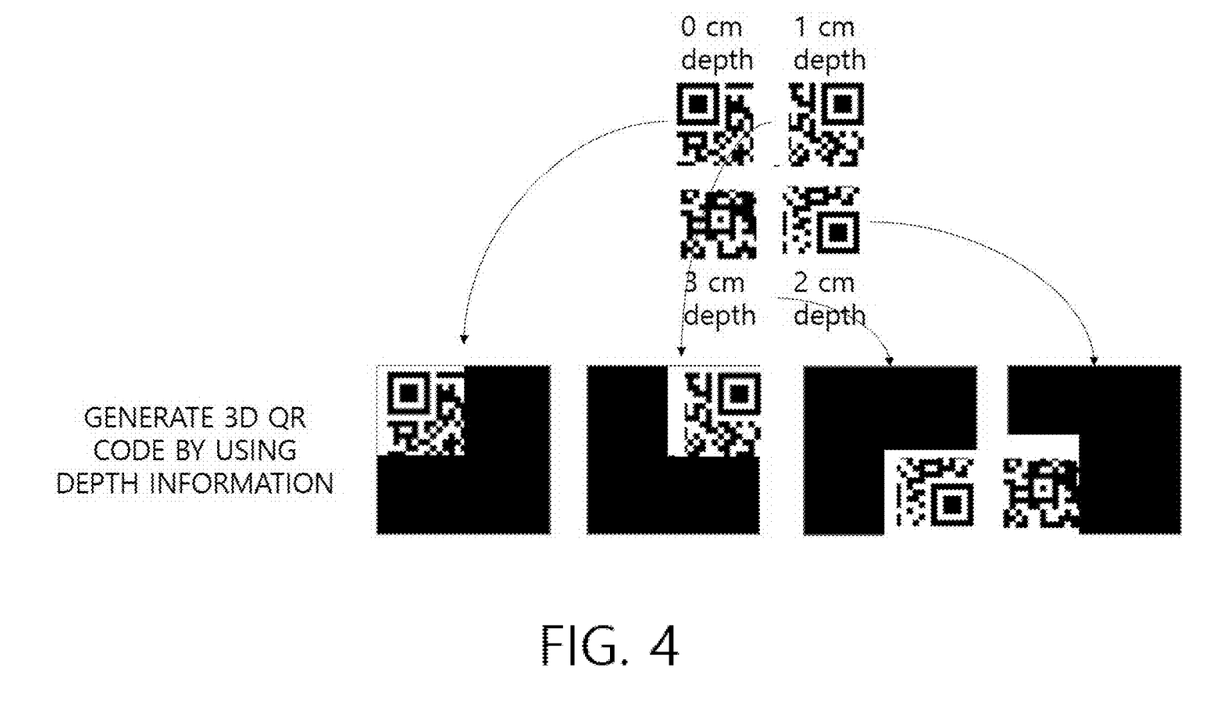
FIG. 4 is a view illustrating a concept of generating a 3D QR code by combining sub QR codes.

FIG. 4 conceptually illustrates generating the 3D QR code by combining the sub QR codes of different depths. As shown in the drawing, only one sub QR code is displayed at one depth of the 3D QR code.

All the depths of the sub QR codes divided at step S120 are not necessarily different from one another. There is no problem as long as the depths of the divided sub QR codes are not all the same. That is, at least one of the divided sub QR codes has only to be coupled at a different depth.

The hologram QR code generated at step S130 is generated in a holographic fringe pattern (S140).

Figure 5:
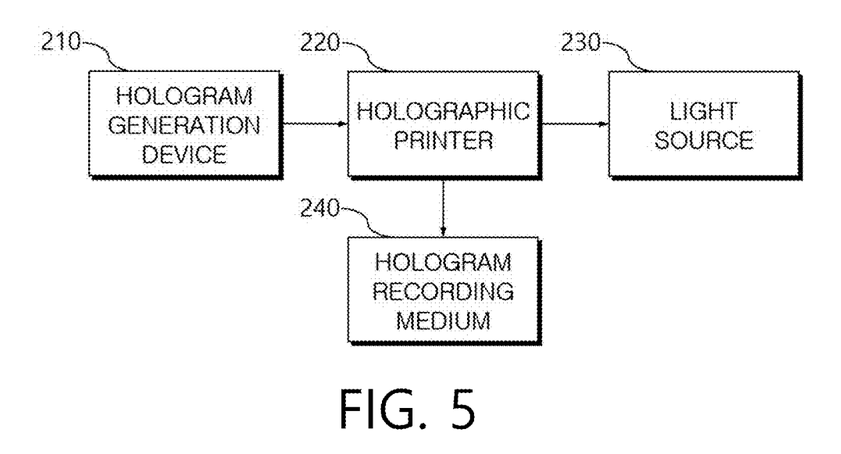
FIG. 5 is a view illustrating a hologram QR code recording system according to another embodiment of the present disclosure.

FIG. 5 is a view illustrating a hologram QR code recording system according to another embodiment of the present disclosure. The hologram QR code recording system according to an embodiment of the present disclosure includes a hologram generation device 210, a holographic printer 220, and a light source 230 as shown in the drawing.

The hologram generation device 210 generates a 3D QR code and generates the generated QR code in a holographic fringe pattern according to the method suggested in FIG. 2. The holographic printer 220 records the holographic fringe pattern generated at the hologram generation device 210 on a hologram recording medium 240. The light source 230 applies a reference beam to the hologram recording medium 240 in the process of recording the holographic fringe pattern.

Accordingly, the hologram recording medium 240 on which the 3D QR code suggested in FIGS. 3 and 4 is recoded as a hologram is fabricated.

Figure 6:
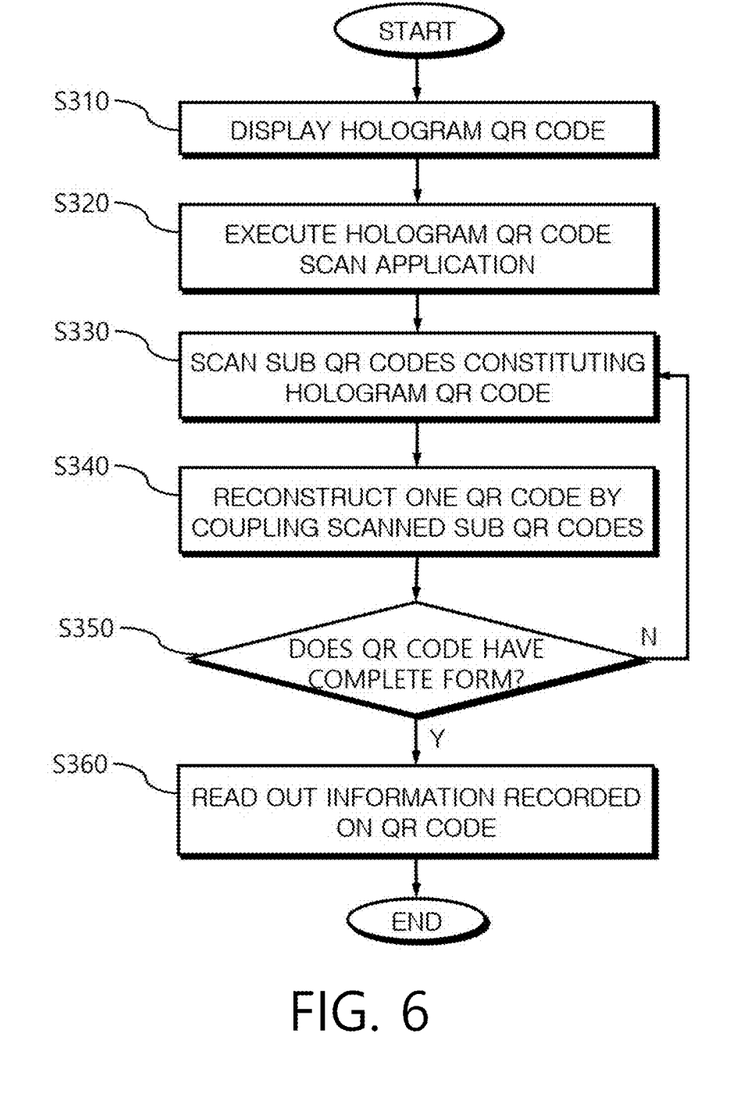
FIG. 6 is a view provided to explain a hologram QR code scan method according to still another embodiment of the present disclosure.

FIG. 6 is a view provided to explain a hologram QR code scan method according to still another embodiment of the present disclosure.

To scan a hologram QR code, the light source (a light emitting diode (LED) or a laser diode light source) applies a reference beam to the hologram recording medium 240 having the hologram QR code recorded thereon, thereby displaying the hologram QR code as a hologram (S310).

When a user executes a hologram QR code scan application on a smartphone (S320), the executed application scans sub QR codes constituting the hologram QR code displayed on the hologram recording medium 240, while adjusting a focal distance of a camera of the smartphone (S330).

At step S330, it is possible to scan from a sub QR code having a shallow depth to a sub QR code having a great depth in sequence.

In the case of the hologram QR code shown in FIGS. 3 and 4, when the focal distance of the camera of the smartphone is a 'distance to a surface of the hologram QR code from the camera' (hereinafter, a 'spacing distance'), the first sub QR code may be scanned, when the focal distance of the camera is the spacing distance+1 cm, the second sub QR code may be scanned, when the focal distance of the camera is the spacing distance+2 cm, the third sub QR code is scanned, and, when the focal distance of the camera is the spacing distance+3 cm, the fourth sub QR code is scanned.

To the contrary, scanning may be performed from the sub QR code having the great depth to the sub QR code having the shallow depth in sequence.

Next, the application may reconstruct one QR code by combining the sub QR codes scanned at step S330 on the same plane (S340). The QR code reconstructed at step S340 is the same as the QR code generated at step S110 of FIG. 2.

Thereafter, the application identifies whether the QR code reconstructed at step S340 has a complete form (S350). The complete form means that all sub QR codes are included, and the QR code has an incomplete form even if only one sub QR code is omitted.

When the QR code reconstructed at step S340 does not have the complete form (S350-N), the application resumes step S330.

On the other hand, when the QR code reconstructed at step S340 has the complete form (S350-Y), the application reads out information recorded on the QR code (S360), and then, provide a service.

Up to now, the hologram QR code that is difficult to duplicate has been described in detail with reference to preferred embodiments.

Embodiments of the present disclosure suggest a structure of a 3D QR code that uses a hologram and is difficult to duplicate, and a generation method thereof, as a method for solving the problem of the related-art technology that a 2D QR code is easy to duplicate.

When a QR code is fabricated as a hologram, not an image but a holographic fringe pattern is recorded on a hologram recording medium. Therefore, since not an image but a holographic fringe pattern should be recorded on a hologram recording medium, it is virtually impossible to duplicate the QR code and the QR code may be applied to a service requiring security.

In addition, the hologram QR code in the above-described embodiments may be implemented by a 3D QR code of other methods, not by the hologram method. Furthermore, the technical concept of the present disclosure may be applied to 3D codes of other forms, in addition to the QR form.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A 3D code generation method comprising:
    dividing a 2D code having pre-defined information recorded thereon into a plurality of sub 2D codes;
    generating a 3D code by coupling at least one of the divided sub 2D codes at a different depth; and
    generating the generated 3D code in a holographic fringe pattern.

2. The method of claim 1, wherein the 2D code is a quick response (QR) code.

3. The method of claim 1, wherein the dividing comprises dividing the 2D code in a grid pattern.

4. The method of claim 1, wherein the generating comprises coupling all of the divided sub 2D codes at different depths, respectively.

5. The method of claim 1, further comprising recording the generated holographic fringe pattern on a hologram recording medium.

6. The method of claim 5, further comprising:
    scanning the sub 2D codes constituting the 3D code which is displayed on the hologram recording medium as a hologram; and
    reconstructing one 2D code by coupling the scanned sub 2D codes on a same plane.

7. The method of claim 6, wherein the scanning comprises scanning from a sub 2D code having a shallow depth to a sub 2D code having a great depth in sequence while adjusting a focal distance of a camera of a mobile terminal.

8. The method of claim 6, wherein, when the reconstructed 2D code has an incomplete form, the scanning is resumed.

9. A 3D code generation system comprising:
    a hologram generation device configured to divide a 2D code having pre-defined information recorded thereon into a plurality of sub 2D codes, to generate a 3D code by coupling at least one of the divided sub 2D codes at a different depth, and to generate the generated 3D code in a holographic fringe pattern; and
    a hologram printer configured to record the generated holographic fringe pattern on a hologram recording medium.

10. The system of claim 9, wherein the 2D code is a quick response (QR) code.

11. The system of claim 9, wherein the dividing comprises dividing the 2D code in a grid pattern.

12. The system of claim 9, wherein the generating comprises coupling all of the divided sub 2D codes at different depths, respectively.

13. The system of claim 9, further comprising recording the generated holographic fringe pattern on a hologram recording medium.

14. The system of claim 13, further comprising:
    scanning the sub 2D codes constituting the 3D code which is displayed on the hologram recording medium as a hologram; and
    reconstructing one 2D code by coupling the scanned sub 2D codes on a same plane.

15. The system of claim 14, wherein the scanning comprises scanning from a sub 2D code having a shallow depth to a sub 2D code having a great depth in sequence while adjusting a focal distance of a camera of a mobile terminal.

16. The system of claim 14, wherein, when the reconstructed 2D code has an incomplete form, the scanning is resumed.

17. A 3D code generation method comprising:
    generating a 2D code having pre-defined information recorded thereon;
    dividing the generated 2D code into a plurality of sub 2D codes; and
    generating a 3D code in a holographic fringe pattern, including coupling at least one of the divided sub 2D codes at a different depth.

18. A 3D code generation system comprising:
    a hologram generation device configured to generate a 2D code having pre-defined information recorded thereon, to divide the generated 2D code into a plurality of sub 2D codes, to generate a 3D code by coupling at least one of the divided sub 2D codes at a different depth, and to generate the generated 3D code in a holographic fringe pattern; and
    a hologram printer configured to record the generated holographic fringe pattern on a hologram recording medium.

* * * * *